(12) United States Patent
Chauveau et al.

(10) Patent No.: US 7,207,675 B1
(45) Date of Patent: Apr. 24, 2007

(54) OPHTHALMIC LENS

(75) Inventors: Jean-Pierre Chauveau, Paris (FR); Bruno Decreton, Charenton le-Pont (FR); Gilles Le Saux, Paris (FR)

(73) Assignee: Essilor International (FR)

( * ) Notice: Subject to any disclaimer, the term of this patent is extended or adjusted under 35 U.S.C. 154(b) by 0 days.

(21) Appl. No.: 11/453,342

(22) Filed: Jun. 14, 2006

(30) Foreign Application Priority Data

Nov. 8, 2005 (FR) .................................. 05 11328

(51) Int. Cl.
*G02C 7/06* (2006.01)
(52) U.S. Cl. ..................................... 351/169; 351/177
(58) Field of Classification Search ................ 351/169, 351/177
See application file for complete search history.

(56) References Cited

U.S. PATENT DOCUMENTS

| | | | |
|---|---|---|---|
| 4,854,689 | A | 8/1989 | Dufour et al. |
| 5,270,745 | A | 12/1993 | Pedrono |
| 5,272,495 | A | 12/1993 | Pedrono |
| 5,488,442 | A | 1/1996 | Harsigny et al. |
| 5,812,238 | A | 9/1998 | Ahsbahs et al. |
| 5,949,519 | A | 9/1999 | Le Saux et al. |
| 6,102,544 | A | 8/2000 | Baudart et al. |
| 6,116,734 | A | 9/2000 | Pedrono et al. |
| 6,183,084 | B1 * | 2/2001 | Chipman et al. ........... 351/176 |
| 6,260,967 | B1 | 7/2001 | Edwards et al. |
| 6,318,859 | B1 | 11/2001 | Baudart et al. |
| 6,382,789 | B1 | 5/2002 | Baudart et al. |
| 6,540,354 | B2 | 4/2003 | Chauveau et al. |
| 6,595,637 | B2 | 7/2003 | Ahsbahs et al. |
| 6,595,638 | B2 | 7/2003 | Ahsbahs et al. |
| 6,652,096 | B1 | 11/2003 | Morris et al. |
| 6,682,194 | B2 | 1/2004 | Ahsbahs et al. |
| 6,793,340 | B1 | 9/2004 | Morris et al. |

(Continued)

FOREIGN PATENT DOCUMENTS

EP   0 990 939   4/2000

(Continued)

OTHER PUBLICATIONS

W.N. Charman et al., "Astigmatism, accommodation, and visual instrumentation", *Applied Otics*, vol. 17, No. 24, pp. 3903-3910 (Dec. 15, 1978).

(Continued)

*Primary Examiner*—Scott J. Sugarman
(74) *Attorney, Agent, or Firm*—Fish & Richardson P.C.

(57) ABSTRACT

Progressive multifocal ophthalmic lens having a power addition prescription and presenting a complex surface having a fitting cross and a principal meridian of progression. The lens has, when being worn, a normalized reduced root mean square deviation of less than 0.025 microns per diopter over a zone that includes the far vision control point and covering a sector whose apex lies 4° below the fitting cross with an angular aperture of between 150° and 160°; and a progression length of 25° or less, the progression length being defined as the angle of lowered of the view direction from the fitting cross down to the point on the meridian for which the wearer's optical power reaches 85% of the addition prescription.

The lens is suitable for increased far vision with good accessibility to near vision.

7 Claims, 4 Drawing Sheets

U.S. PATENT DOCUMENTS

| | | |
|---|---|---|
| 2002/0171803 A1 | 11/2002 | Ahsbahs et al. |
| 2002/0176048 A1 | 11/2002 | Ahsbahs et al. |
| 2002/0180928 A1 | 12/2002 | Ahsbahs et al. |
| 2003/0156251 A1 | 8/2003 | Welk et al. |

FOREIGN PATENT DOCUMENTS

| | | |
|---|---|---|
| FR | 2 588 973 | 4/1987 |
| FR | 2 683 642 | 5/1993 |
| FR | 2 699 294 | 6/1994 |
| FR | 2 704 327 | 10/1994 |
| FR | 2 753 805 | 3/1998 |
| FR | 2 769 997 | 4/1999 |
| FR | 2 769 998 | 4/1999 |
| FR | 2 769 999 | 4/1999 |
| FR | 2 770 000 | 4/1999 |
| FR | 2 809 193 | 11/2001 |
| FR | 2 820 515 | 8/2002 |
| FR | 2 820 516 | 8/2002 |
| GB | 2 277 997 | 11/1994 |
| WO | WO 98/12590 | 3/1998 |
| WO | WO 03/048841 | 6/2003 |

OTHER PUBLICATIONS

Rainer G. Dorsch et al., "Coma and Design Characteristics of Progressive Addition Lenses", *Vision Science and Its Applications*, Technical Digest Series vol. 1, Santa Fe, New Mexico pp. SaA3-1 / 68-SaA3-4 / 71(Feb. 6-9, 1998).

Eloy A. Villegas et al., "Spatially Resolved Wavefront Aberrations of Ophthalmic Progressive-Power Lenses in Normal Viewing Conditions", *Optometry and Vision Science*, vol. 80, No. 2, pp. 106-114 (Feb. 2003).

* cited by examiner

OPHTHALMIC LENS

CROSS REFERENCE TO RELATED APPLICATIONS

Pursuant to U.S.C. § 119, this application claims the benefit of French Patent Application 05 11 328, filed Nov. 8, 2005. The contents of the prior application is incorporated herein by reference in its entirety.

TECHNICAL FIELD

This invention relates to an ophthalmic lens.

BACKGROUND

Any ophthalmic lens intended to be worn in a frame is associated with a prescription. In ophthalmics, the prescription may comprise a power prescription, either positive or negative, and an astigmatism prescription. These prescriptions correspond to corrections to be provided to the wearer of the lenses in order to correct defects in his vision. A lens is fitted into the frame according to the prescription and the position of the wearer's eyes relative to the frame.

In the simplest cases, the prescription is nothing more than a power prescription. The lens is said to be a unifocal lens and exhibits symmetry of revolution. It is simply fitted into the frame so that the principal viewing direction of the wearer coincides with the axis of symmetry of the lens.

For presbyopic wearers (long-sighted subjects), the value of the power correction in far vision is different from that in near vision, owing to the difficulties of accommodation in near vision. The prescription is therefore made up of a far vision power value and an addition (or power progression) representative of the power increment between the far vision and the near vision; this amounts to a far-vision power prescription and a near-vision power prescription. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or FR-A-2 704 327. These progressive multifocal ophthalmic lenses comprise a far vision zone, a near vision zone and an intermediate vision zone, a principal meridian of progression passing through these three zones. They are generally determined by optimization on the basis of a number of constraints imposed on various characteristics of the lens. These lenses are general-purpose lenses in that they are adapted to the different needs of the wearer.

Families of progressive multifocal lenses are defined in which each lens of a family is characterized by an addition, which corresponds to the power variation between the far vision zone and the near vision zone. More precisely, the addition, denoted by A, corresponds to the power variation between a point FV in the far vision zone and a point NV in the near vision zone, which are called the far-vision control point and the near-vision control point, respectively, and which represent the points of intersection of viewing with the surface of the lens for vision at infinity and for reading vision.

In any one family of lenses, the addition varies from one lens to another of the family, between a minimum addition value and a maximum addition value. Usually, the minimum and maximum addition values are 0.75 dioptres and 3.5 dioptres respectively, and the addition varies from 0.25 dioptres in 0.25 dioptre steps from one lens of the family to the other.

Lenses of the same addition differ by the value of the mean sphere at a reference point, called here the base. For example, it is possible to choose to measure the base at the far-vision measurement point FV. Thus, by choosing an addition/base pair, a set of aspherical front faces is defined for progressive multifocal lenses. Usually, five base values and twelve addition values may thus be defined, i.e. sixty front faces. In each of the bases, an optimization for a given power is carried out. This known method makes it possible, starting from semi-finished lenses, only the front face of which is conformed, to prepare lenses suitable for each wearer by simply machining a spherical or toric rear face.

Thus, progressive multifocal lenses usually have an aspherical front face, which is that face of the spectacles on the opposite side from the wearer, and a spherical or toric rear face, turned towards the person wearing the spectacles. This spherical or toric face allows the lens to be adapted to the user's ametropia so that a progressive multifocal lens is generally defined only by its aspherical surface. As is well known, such an aspherical surface is generally defined by the height of all its points. The parameters formed by the minimum and maximum curvatures at each point, or more usually their half-sum and their difference, are also used. This half-sum and this difference, when these are multiplied by a factor (n−1), n being the refractive index of the material of the lens, are called the mean sphere and the cylinder, respectively.

A progressive multifocal lens may thus be defined, at any point on its complex surface, by geometrical characteristics comprising a mean sphere value and a cylinder value, these being given by the following formulae.

As is known, a mean sphere D at any point on a complex surface is defined by the formula:

$$D = \frac{n-1}{2}\left(\frac{1}{R_1} + \frac{1}{R_2}\right)$$

where $R_1$ and $R_2$ are the local maximum and minimum radii of curvature, expressed in meters, and n is the index of the constituent material of the lens.

A cylinder C is also defined by the formula:

$$C = (n-1)\left|\frac{1}{R_1} - \frac{1}{R_2}\right|.$$

The characteristics of the complex face of the lens may be expressed by means of the mean sphere and the cylinder.

Moreover, a progressive multifocal lens may also be defined by optical characteristics, taking into consideration the situation of the person wearing the lenses. This is because the optical ray-tracing laws result in optical defects when the rays move away from the central axis of any lens. These known defects, which include amongst others a power defect and an astigmatism defect, can generically be called ray obliquity defects.

Ray obliquity defects have already been well identified in the prior art and improvements have been proposed. For example, document WO-A-98/12590 describes a method of determining, by optimization, a set of progressive multifocal ophthalmic lenses. That document proposes to define the set of lenses by considering the optical characteristics of the lenses, and especially the wearer power and the oblique astigmatism under wearing conditions of the lenses. The lens is optimized by ray tracing on the basis of an ergorama associating, with each viewing direction under the wearing conditions, a target object point.

SUMMARY

It is also possible to consider optical aberrations called higher-order aberrations, such as spherical aberration or coma, involving the distortions suffered by a non-aberrant spherical wavefront passing through the lens.

It is considered that the eye rotates behind the lens in order to scan its entire surface. Thus, an optical system, composed of the eye and the lens, is considered at each point, as will be explained in detail later on with reference to FIGS. 1 to 3. The optical system is thus different at each point on the surface of the lens, since the relative positions of the principal axis of the eye and of the lens are actually different at each point owing to the rotation of the eye behind the lens.

In each of these successive positions, the aberrations undergone by the wavefront passing through the lens and limited by the eye's pupil are calculated.

The spherical aberration arises for example from the fact that the rays passing through at the edge of the pupil do not converge on the same plane as the rays passing through close to its centre. Moreover, coma represents the fact that the image of a point located off-axis will have a "comet-like" trail, due to the power variation of the optical system. The reader may refer to the article by R. G. Dorsch and P. Baumbach, "*Coma and Design Characteristics of Progressive Addition Lenses*", Vision Science and its Applications, Santa Fe, February 1998, which describes the effects of coma on a progressive multifocal lens.

The distortions of this wavefront may be described overall by the root mean square or RMS deviation. The RMS deviation is generally expressed in microns ($\mu$m) and denotes, for each point on the complex surface, the deviation of the resulting wavefront relative to a non-aberrant wavefront. The invention proposes a progressive multifocal lens defined by its optical characteristics under wearing conditions, guaranteeing good visual acuity of the person wearing the progressive lenses, especially in terms of far vision, while allowing good accessibility to the power levels needed for near vision.

The invention consequently proposes a progressive multifocal ophthalmic lens having a power addition prescription and presenting a complex surface having:
  a fitting cross;
  a far vision zone with a control point, a near vision zone with a control point and an intermediate vision zone;
  a principal meridian of progression passing through these three zones,
  the lens having, when being worn and relative to a plane far vision prescription by adjustment of the radii of curvature of at least one of its faces:
    a reduced root mean square deviation, normalized to the addition prescription, of less than 0.025 microns per dioptre over a zone that includes the far vision control point and covering a sector whose apex lies on the meridian of progression at approximately 4° below the fitting cross with an angular aperture of between 150° and 160°, the reduced root mean square deviation being calculated by setting to zero the 1st- and 2nd-order coefficients in the Zernike polynomial expansion of a wavefront passing through the lens; and
    a progression length of 25° or less, the progression length being defined as the angle of lowered viewing from the fitting cross down to the point on the meridian for which the wearer optical power reaches 85% of the addition prescription.

The lens according to the invention has one or more of the following characteristics, depending on the embodiment:
  the normalized reduced root mean square deviation zone of less than 0.025 $\mu$m/D covers an angular aperture sector of 155°;
  the normalized reduced root mean square deviation zone of less than 0.025 $\mu$m/D covers a sector having a mid-axis approximately coincident with the principal meridian of progression in the far vision zone;
  the normalized reduced root mean square deviation zone of less than 0.025 $\mu$m/D covers a radius sector of between 35° and 45°; and
  the normalized reduced root mean square deviation zone of less than 0.025 $\mu$m/D covers a radius sector of approximately 40°.

The invention also relates to visual equipment comprising at least one lens according to the invention and a method of correcting the vision of a presbyopic subject, comprising the supplying to the subject or the wearing by the subject of such equipment.

DESCRIPTION OF DRAWINGS

Other advantages and features of the invention will become apparent on reading the following description of the embodiments of the invention, these being given by way of example and with reference to the drawings which show.

DETAILED DESCRIPTION

Figure 1:
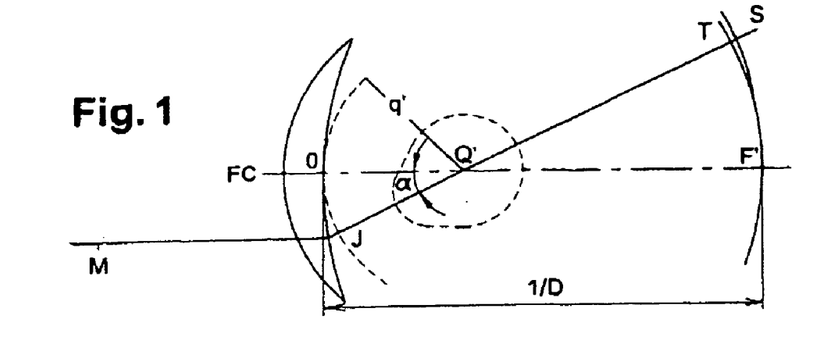
FIG. 1, a diagram of a lens/eye optical system, seen from above.

Conventionally, characteristic optical quantities, namely a power and astigmatism, are defined for a given lens under the conditions in which it will be worn. FIG. 1 shows a diagram of a lens/eye optical system in side view, and shows the definitions used in the rest of the description. The centre of rotation of the eye is called Q'. The axis Q'F' shown in the figure by the dot/dash line is the horizontal axis passing through the centre of rotation of the eye and extending in front of the wearer—in other words the axis Q'F' corresponds to the primary viewing direction. This axis cuts, on the front face, a point on the lens called the FC (fitting cross), which is marked on lenses in order to allow them to be positioned by an optician. The fitting cross is generally located 4 mm above the geometric centre of the front face. Let the point O be the point of intersection by this axis Q'F' on the rear face. A vertex sphere, with centre Q' and radius q', is defined, which sphere cuts the rear face of the lens at point O. As an example, a value of the radius q' of 27 mm corresponds to a standard value and provides satisfactory results when the lenses are worn. The cut of the lens may be drawn in the (O,x,y) plane defined with reference to FIG. 2. The tangent to this curve at the point O is inclined to the (O,y) axis at an angle called the pantoscopic angle. The value of the pantoscopic angle is typically 8°. It is also possible to draw the cut of the lens in the (O,x,z) plane. The tangent to this curve at the point O is inclined to the (O,z) axis at what is called the curving contour. The value of the curving contour is typically 0°.

A given viewing direction—shown by the solid line in FIG. 1—corresponds to a position of the eye rotating about Q' and to a point J on the apex sphere. A viewing direction may also be identified, in spherical coordinates, by two angles $\alpha$ and $\beta$. The angle $\alpha$ is the angle made between the Q'F' axis and the projection of the straight line Q'J on the horizontal plane containing the Q'F' axis, this angle appearing in the diagram of FIG. 1. The angle $\beta$ is the angle made between the Q'F' axis and the projection of the straight line Q'J on the vertical plane containing the Q'F' axis. A given viewing direction therefore corresponds to a point J on the apex sphere or to a coordinate pair $(\alpha,\beta)$.

In a given viewing direction, the image of a point M in the object space, located at a given object distance, is formed between two points S and T corresponding to minimum and maximum distances JS and JT (which would be the sagittal and tangential focal lengths in the case of surfaces of revolution and of a point M at infinity). The angle $\gamma$, identified as the astigmatism axis, is the angle made by the image corresponding to the shortest distance with the $(z_m)$ axis in the $(z_m, y_m)$ plane defined with reference to FIGS. 2 and 3. The angle $\gamma$ is measured in the anti-clockwise direction when looking at the wearer. In the example of FIG. 1, the image of a point in the object space at infinity is formed, on the Q'F' axis, at the point F'. The points S and T are coincident, which amounts to stating that the lens is locally spherical in the primary viewing direction. The distance D is the rear frontal plane of the lens.

Figure 2:
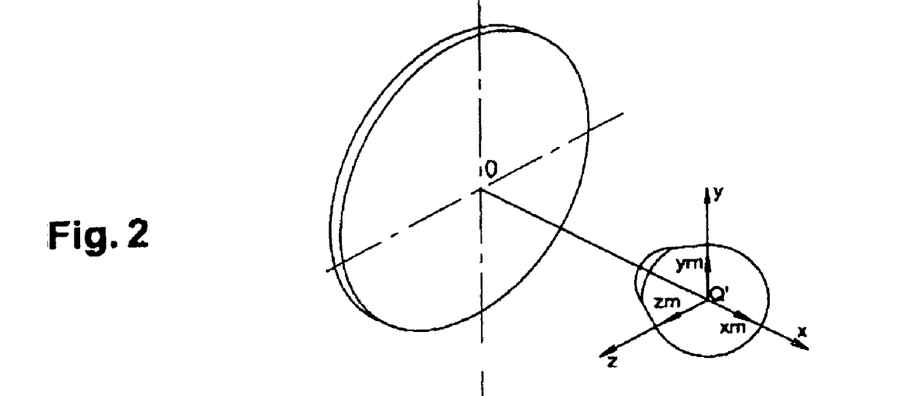
FIGS. 2 and 3, perspective diagrams of a lens/eye system.
Figure 3:
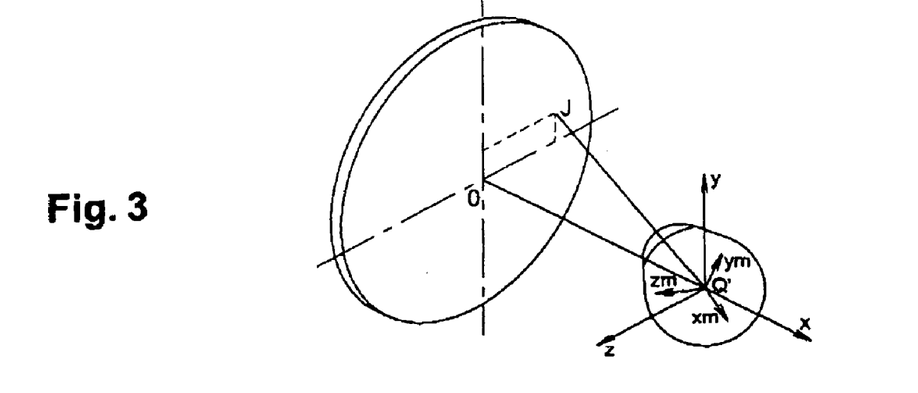

FIGS. 2 and 3 show perspective diagrams of a lens/eye system. FIG. 2 shows the position of the eye and the reference frame associated with the eye, in the principal viewing direction, $\alpha=\beta=0$, called the primary viewing direction. The points J and O are then coincident. FIG. 3 shows the position of the eye and the reference frame that is associated therewith in a direction $(\alpha,\beta)$. Shown in FIGS. 2 and 3 are a fixed reference frame $\{x,y,z\}$ and a reference frame $\{x_m, y_m, z_m\}$ associated with the eye in order to show clearly the rotation of the eye. The reference frame $\{x,y,z\}$ has as origin the point Q' and the x-axis is the Q'F' axis—the point F' not being shown in FIGS. 2 and 3 and passes through the point O. This axis is directed from the lens to the eye in correspondence with the direction of measurement of the astigmatism axis. The $\{y,z\}$ plane is the vertical plane. The y-axis is vertical and directed upwards. The z-axis is horizontal, the reference frame being a direct orthonormal coordinate system. The reference frame $\{x_m, y_m, z_m\}$ associated with the eye has the point Q' as centre. The $x_m$ axis is defined by the viewing direction JQ', and coincides with the $\{x,y,z\}$ reference frame in the case of the primary viewing direction. Listing's law gives the relationships between the $\{x,y,z\}$ and $\{x_m, y_m, z_m\}$ coordinate systems for each viewing direction—see Legrand, *Optique Physiologique*, Volume 1, published by Revue d'Optique, Paris 1965.

Using these elements, it is possible to define a wearer optical power and astigmatism, in each viewing direction. An object point M at an object distance given by the ergorama is considered for a viewing direction $(\alpha,\beta)$. The points S and T between which the image of the object is formed is determined. The image proximity IP is then given by:

$$IP = \frac{1}{2}\left(\frac{1}{JT} + \frac{1}{JS}\right)$$

while the object proximity OP is given by:

$$OP = \frac{1}{MJ}.$$

The power is defined as the sum of the object and image inverse distances, i.e.

$$P = OP + IP = \frac{1}{MJ} + \frac{1}{2}\left(\frac{1}{JT} + \frac{1}{JS}\right).$$

The amplitude of the astigmatism is given by:

$$A = \left|\frac{1}{JT} - \frac{1}{JS}\right|.$$

The angle of the astigmatism is the angle $\gamma$ defined above: this is the angle measured in a reference frame associated with the eye, relative to the $z_m$ direction with which the image T is formed in the $(z_m, y_m)$ plane. These power and astigmatism definitions are optical definitions, under wearing conditions and in a reference frame associated with the eye. Qualitatively, the power and the astigmatism thus defined correspond to the characteristics of a thin lens which, placed instead of the lens in the viewing direction, would locally provide the same images. It should be pointed out that the definition provides, in the primary viewing direction, the classical astigmatism prescription value. Such a prescription is produced by the ophthalmologist, in far vision, in the form of a pair consisting of an axis value (in degrees) and an amplitude value (in dioptres).

The power and the astigmatism thus defined can be measured experimentally on the lens using a frontofocometer. They may also be calculated by ray tracing under wearing conditions.

The invention proposes a progressive multifocal ophthalmic lens having the advantages of enlarged far vision, with also good accessibility in near vision. The lens provides good visual acuity in far vision with a clear field, limiting optical aberrations over a section lying below the fitting cross and covering a large angle in the far vision zone. The proposed solution thus provides good accessibility to the powers needed for near vision, allowing the wearer to see satisfactorily at distances of about 40 cm without having to lower his eyes substantially, the near vision zone being accessible from 25° below the fitting cross. The lens is thus a lens adapted to enlarged far vision and to near vision. The lens has a prescription such that the power values prescribed to the wearer in far vision and in near vision are achieved on the lens.

The lens will be described below with reference to one embodiment suitable for presbyopic wearers having a power progression prescription of 2 dioptres.

FIGS. 4 to 7 show a 60 mm diameter lens with a progressive multifocal front face and having a prism of 1.15° of geometric base, oriented at 270° in the TABO coordinate system. The plane of the lens is inclined at 8° to the vertical and the lens has a thickness of 2 mm. A q' value of 27 mm (as defined with reference to FIG. 1) is considered for the measurements on the lens of FIGS. 4 to 7.

Figure 5:
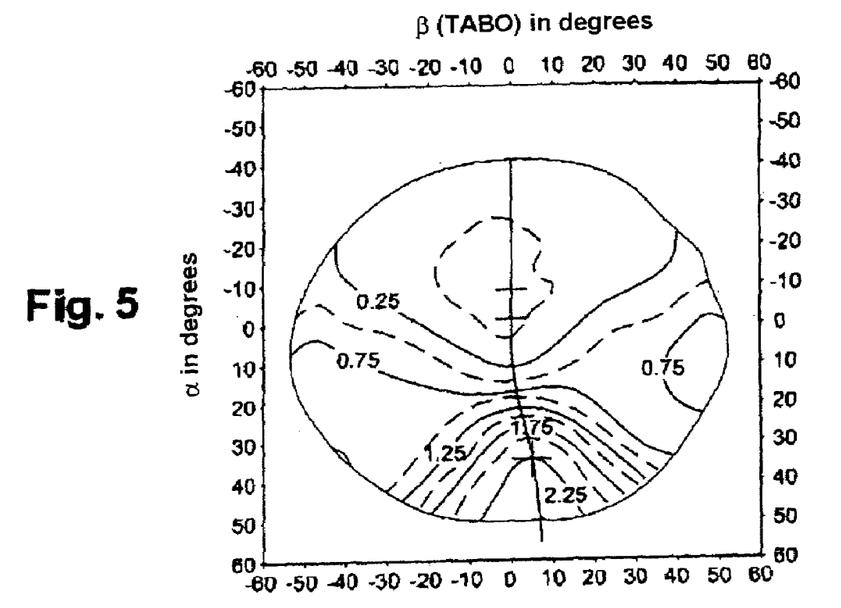
FIG. 5, a wearer optical power map of the lens according to the invention.
Figure 6:
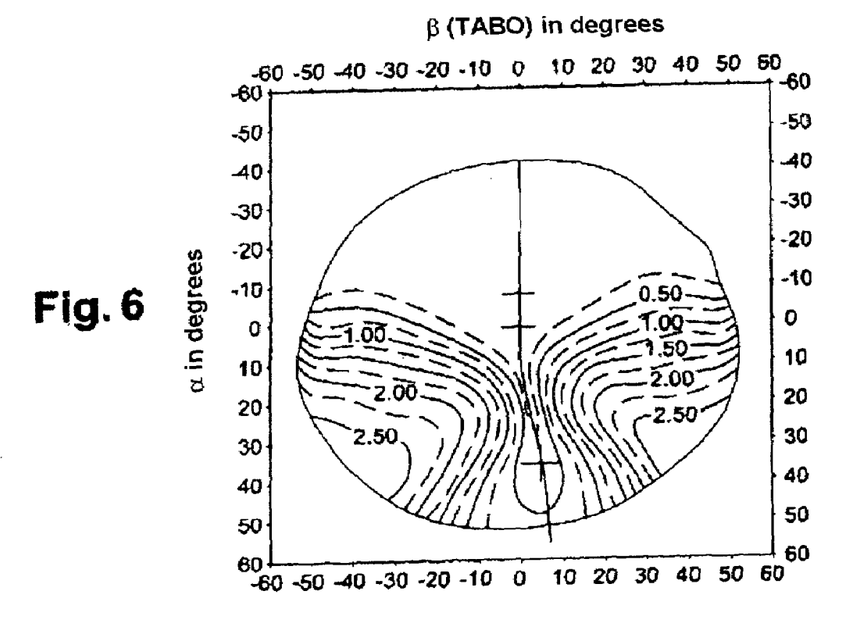
FIG. 6, an oblique astigmatism amplitude map of the lens according to the invention.
Figure 7:
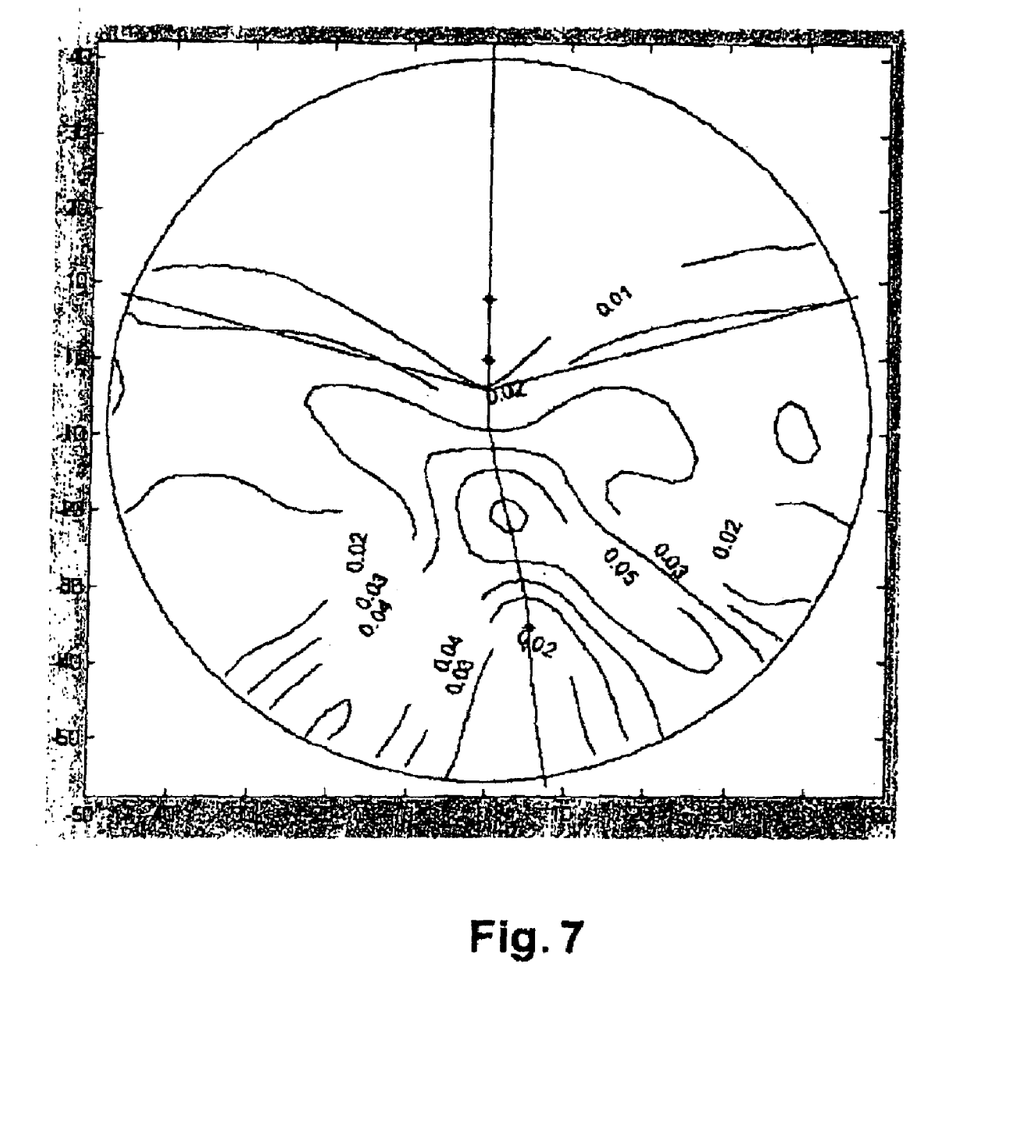
FIG. 7, a normalized reduced RMS map of the lens according to the invention.

The lens shown in FIGS. 5 to 7 is in a spherical coordinate system, the angle β being plotted on the x-axis and the angle α being plotted on the y-axis.

The lens has an approximately umbilical line, called the meridian, on which the astigmatism is virtually zero. The meridian is coincident with the vertical axis in the upper portion of the lens and is inclined on the nasal side in the lower portion of the lens, the convergence being more pronounced in near vision.

The figures show the meridian and reference marks on the lens. The fitting cross FC of the lens may be geometrically located on the lens by a cross or any other mark, such as a dot surrounded by a circle traced on the lens, or by any other appropriate means. This is an alignment point physically placed on the lens, which is used by the optician for fitting the lens into the frame. In spherical coordinates, the fitting cross has the coordinates (0°,0°) since it corresponds to the point of intersection of the front face of the lens with the primary viewing direction, as defined above. The far vision control point FV is located on the meridian and corresponds to a viewing elevation of 8° above the fitting cross. The far vision control point FV has the coordinates (0°,−8°) in the predefined spherical coordinate system. The near vision control point NV is located on the meridian and corresponds to a lowering of the viewing direction by 35° below the fitting cross. The near vision control point NV has the coordinates (6°,35°) in the predefined spherical coordinate system.

Figure 4:
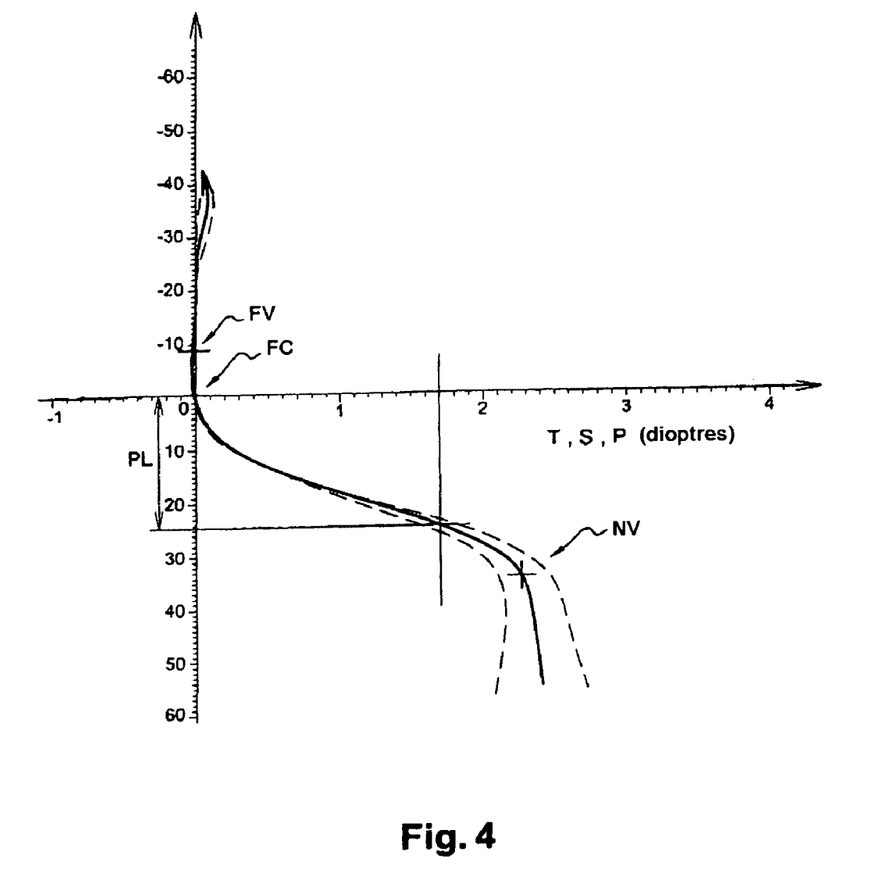
FIG. 4, a wearer optical power graph along the meridian of a lens according to the invention.

FIG. 4 shows a graph of the wearer optical power along the meridian. The angle β is plotted on the y-axis and the power in dioptres is plotted on the x-axis. The minimum and maximum optical powers, corresponding to the abovementioned quantities 1/JT and 1/JS respectively, are shown as the dashed curves and the optical power P as defined above is shown as the bold curve.

The figure shows that there is an approximately constant wearer optical power around the far vision control point FV, an approximately constant wearer optical power around the near vision control point NV, and a uniform progression of the power along the meridian. The values are shifted to zero at the origin, where the optical power is in fact −0.03 dioptres corresponding to a plane far-vision lens prescribed for emmetropic presbyopic subject.

In the case of a progressive multifocal lens, the intermediate vision zone generally starts in the region of the fitting cross FC; this is the point where the power progression starts. Thus, the optical power increases from the fitting cross to the near vision control point NV, for 0 to 35° values of the angle β. For angle values greater than 35°, the optical power then becomes approximately constant again, with a value of 2.23 dioptres. It should be noted that the wearer optical power progression (2.26 dioptres) is greater than the prescribed power addition A (2 dioptres). This difference in power value is due to oblique effects.

A progression length, denoted PL in FIG. 4, may be defined on a lens, this being the angular distance—or the difference in ordinates—between the optical centre of the lens, or the fitting cross FC, and a point on the meridian at which the power progression reaches 85% of the prescribed power addition A. In the example shown in FIG. 4, an optical power of 0.85×2 dioptres, that is to say 1.7 dioptres, is reached for a point with the angular coordinate β=24.5° approximately.

The lens according to the invention thus exhibits accessibility to the powers needed for near vision with a moderate lowering of the glance of 25° or less. This accessibility guarantees comfortable use of the near-vision zone.

FIG. 5 shows the level lines of the wearer optical power defined along one viewing direction and for an object point. As is usual, the isopower lines have been plotted in FIG. 5 in a spherical coordinate system. These lines are formed from points having the same optical power value P. Isopower lines of 0 dioptres to 2.25 dioptres have been shown.

FIG. 5 shows a far vision zone with no power variation, extending below the fitting cross. The value of the wearer optical power is therefore approximately constant around the fitting cross FC. This almost zero power variation around the fitting cross allows a certain tolerance in positioning the lens when fitting it into the visual equipment, as will be explained later.

FIG. 6 shows the level lines corresponding to the oblique astigmatism amplitude under wearing conditions. As is usual, the isoastigmatism lines are plotted in FIG. 6 in a spherical coordinate system; these lines are formed from points having the same astigmatism amplitude, as defined above. The 0.25 dioptre to 2.50 dioptre isoastigmatism lines have been shown.

It may be seen that the far vision zone is relatively clear—the isoastigmatism lines above 0.25 dioptres open broadly so as to free the far vision field. It may also be seen that the isoastigmatism lines widen, in the lower portion of the lens, at the height of the near vision reference point NV. In the lower portion of the lens, the 0.75 and 1 dioptre isoastigmatism lines are almost parallel and vertical, defining a zone containing the near vision reference point NV.

FIG. 7 shows the reduced RMS level lines normalized to the calculated addition prescription under wearing conditions. The RMS is calculated for each viewing direction, and therefore for each point on the glass of the lens using a ray-tracing method. A wearer pupil diameter of approximately 5 mm is considered. The RMS shows, for each point on the lens corresponding to a viewing direction, the deviation between the resultant wavefront and a non-aberrant spherical reference wavefront corresponding to the best sphere passing through this resultant wavefront. The RMS values have been calculated for the lens of FIGS. 4 to 6, that is to say for a plane far-vision lens having a power addition prescription of 2 dioptres, prescribed for emmetropic presbyopic subjects.

One possible arrangement for measuring the aberrations of a wavefront passing through the lens, as perceived by the wearer's eye, is described in the article by Eloy A. Villegas and Pablo Artal, "*Spatially Resolved Wavefront Aberrations of Ophthalmic Progressive-Power Lenses in Normal Viewing Conditions*", Optometry and Vision Science, Vol. 80, No. 2, February 2003.

As is known, a wavefront that has passed through an aspherical surface may be expressed by a Zernike polynomial expansion. More precisely, a wave surface may be approximated by a linear combination of polynomials of the type:

$$z(x_m, y_m, z_m) = \sum_i a_i p_i(x_m, y_m, z_m)$$

where the $P_i$ are the Zernike polynomials and the $a_i$ are the real coefficients.

The Zernike polynomial expansion of the wavefront and the calculation of the aberrations of the wavefront have been standardized by the Optical Society of America, the standard being available at the Harvard University website ftp://color.eri.harvard.edu/standardization/Standards_TOPS4.pdf.

The RMS is thus calculated under the conditions when the lens is being worn. The RMS is then reduced, that is to say the 1st-order and 2nd-order coefficients in the Zernike polynomial expansion of the wavefront are set to zero. The optical power and astigmatism defect aberrations are therefore not included in the reduced RMS calculation. The RMS is then normalized, that is to say divided by the prescribed power addition.

In FIG. 7, the normalized reduced RMS is shown, expressed in microns per dioptre. The iso-RMS lines from 0.01 μm/D to 0.05 μm/D have been shown. Drawn on FIG. 7 is a sector whose apex lies on the principal meridian of progression at 4° below the fitting cross FC and with an angular aperture of 155°. Depending on the optical optimization criteria used, the angular aperture of this sector may be between 150° and 160°. In the zone of the lens covered by this sector, which includes the far vision control point FV, the normalized reduced RMS is limited to 0.025 ml/D. This zone having a normalized reduced RMS of low value ensures that the wearer has optimum visual perception in far vision.

For reasons of symmetry of the lenses, the sector thus defined may have a median axis approximately coincident with the principal meridian of progression in the far vision zone.

In FIG. 7, the sector having a normalized reduced RMS limited to 0.025 μm/D has a radius of 40°. However, depending on the optical optimization criteria used, this radius may be between 35° and 45°.

The lens according to the invention therefore has a very clear far vision zone with limited optical aberrations.

The lens according to the invention is prescribed when considering far-vision and near-vision wearer prescriptions, thereby determining the necessary addition. When the complex surface is on the front face of the lens, the necessary power may be obtained, as in the prior art, by machining the rear face in order to ensure that the power is identical to the prescribed power.

The fitting of the lens into visual equipment may be accomplished in the following manner. The horizontal position of the wearer's pupil in far vision is measured, i.e. only the pupil half-distance, and the total calibre height of the visual equipment frame is determined. The lens is then fitted into the visual equipment with the fitting cross positioned at the measured position.

The reader may refer on this point to Patent Application FR-A-2 807 169 which describes a simplified method of fitting ophthalmic lenses into a frame. That document describes in particular the various measurements made by opticians and proposes to measure only the pupil half-distance in order to effect the fitting of the lenses into the frame using the total calibre height of the frame.

Fitting the lens therefore requires only a conventional measurement of the far-vision pupil half-distance, and a measure of the calibre height of the frame, in order to determine the height at which the fitting cross must be placed in the frame. Next, the lens is machined and fitted into the frame, so that the fitting cross is at a defined position. The vertical position of the fitting cross may of course be determined conventionally by making a measurement of the fitting height, by measuring the fitting height by measuring the position in the frame of the viewing direction when the subject is looking in far vision. This measurement is performed conventionally, the subject wearing the frame and looking at infinity.

The lens according to the invention may have an improved tolerance to the fitting described above. This tolerance is provided by limiting the optical aberrations around the fitting cross. In particular, the wearer power and oblique astigmatism values are approximately constant around the fitting cross. Furthermore, the normalized reduced RMS value is limited around the fitting cross.

The lens described above may be obtained by optimizing a surface using the optimization methods known per se and described in the documents of the prior art that were mentioned earlier relating to progressive multifocal lenses. In particular, optimization software is used to calculate the optical characteristics of the lens/eye system with a predetermined figure of merit. For the optimization, one or more of the criteria presented in the above description with reference to FIGS. 4 to 7 may be used, and especially:

a normalized reduced root mean square (RMS) deviation of less than 0.025 μm/D over a zone that includes the far vision control point FV and covering a sector whose apex lies on the meridian of progression at approximately 4° below the fitting cross with an angular aperture of between 150° and 160°; and a progression length of 25° or less, the progression length being defined as the angle of lowered viewing from the fitting cross down to the point on the meridian for which the wearer optical power reaches 85% of the addition prescription.

These criteria may be combined with others, and especially with a radius of the sector of the normalized reduced root mean square deviation zone of less than 0.025 μm/D between 35° and 45°.

The choice of these criteria makes it possible to obtain a lens by optimization. A person skilled in the art would readily understand that the lens in question does not necessarily have the values corresponding exactly to the criteria imposed. For example, it is not essential for the upper value of the normalized reduced RMS to be reached or for the apex of the limited normalized reduced RMS sector to be exactly at 4° below the fitting cross.

In the above optimization examples, it has been proposed to optimize only one of the faces of the lenses. It is clear that, in all these examples, the role of the front and rear surfaces may easily be changed over, whenever optical objectives similar to those of the lens described are achieved.

What is claimed is:

1. Progressive multifocal ophthalmic lens having a power addition prescription and presenting a complex surface having:

a fitting cross;

a far vision zone with a control point, a near vision zone with a control point and an intermediate vision zone;

a principal meridian of progression passing through these three zones, the lens having, when being worn and relative to a plane far vision prescription by adjustment of the radii of curvature of at least one of its faces:

a reduced root mean square deviation, normalized to the addition prescription, of less than 0.025 microns per dioptre over a zone that includes the far vision control point and covering a sector whose apex lies on the meridian of progression at approximately 4° below the fitting cross with an angular aperture of between 150° and 160°, the reduced root mean square deviation being calculated by setting to zero the 1st- and 2nd-order coefficients in the Zernike polynomial expansion of a wavefront passing through the lens; and a progression length of 25° or less, the progression length being defined as the angle of lowered viewing from the fitting cross down to the point on the meridian for which the wearer optical power reaches 85% of the addition prescription.

2. Lens according to claim 1, characterized in that the normalized reduced root mean square deviation zone of less than 0.025 μm/D covers an angular aperture sector of 155°.

3. Lens according to claim 1 or 2, characterized in that the normalized reduced root mean square deviation zone of less than 0.025 μm/D covers a sector having a mid-axis approximately coincident with the principal meridian of progression in the far vision zone.

4. Lens according to claim 1, characterized in that the normalized reduced root mean square deviation zone of less than 0.025 μm/D covers a radius sector of between 35° and 45°.

5. Lens according to claim 4, characterized in that the normalized reduced root mean square deviation zone of less than 0.025 μm/D covers a radius sector of approximately 40°.

6. Visual equipment comprising at least one progressive multifocal ophthalmic lens having a power addition prescription and presenting a complex surface having:
   a fitting cross;
   a far vision zone with a control point, a near vision zone with a control point and an intermediate vision zone;
   a principal meridian of progression passing through these three zones,
   the lens having, when being worn and relative to a plane far vision prescription by adjustment of the radii of curvature of at least one of its faces:
   a reduced root mean square deviation, normalized to the addition prescription, of less than 0.025 microns per dioptre over a zone that includes the far vision control point and covering a sector whose apex lies on the meridian of progression at approximately 4° below the fitting cross with an angular aperture of between 150° and 160°, the reduced root mean square deviation being calculated by setting to zero the 1st- and 2nd-order coefficients in the Zernike polynomial expansion of a wavefront passing through the lens; and
   a progression length of 25° or less, the progression length being defined as the angle of lowered viewing from the fitting cross down to the point on the meridian for which the wearer optical power reaches 85% of the addition prescription.

7. Method of correcting the vision of a presbyopic subject, comprising the supplying to the subject, or the wearing by the subject, of a visual equipment comprising at least one progressive multifocal ophthalmic lens having a power addition prescription and presenting a complex surface having:
   a fitting cross;
   a far vision zone with a control point, a near vision zone with a control point and an intermediate vision zone;
   a principal meridian of progression passing through these three zones,
   the lens having, when being worn and relative to a plane far vision prescription by adjustment of the radii of curvature of at least one of its faces:
   a reduced root mean square deviation, normalized to the addition prescription, of less than 0.025 microns per dioptre over a zone that includes the far vision control point and covering a sector whose apex lies on the meridian of progression at approximately 4° below the fitting cross with an angular aperture of between 150° and 160°, the reduced root mean square deviation being calculated by setting to zero the 1st- and 2nd-order coefficients in the Zernike polynomial expansion of a wavefront passing through the lens; and
   a progression length of 25° or less, the progression length being defined as the angle of lowered viewing from the fitting cross down to the point on the meridian for which the wearer optical power reaches 85% of the addition prescription.

* * * * *

UNITED STATES PATENT AND TRADEMARK OFFICE
CERTIFICATE OF CORRECTION

PATENT NO. : 7,207,675 B1
APPLICATION NO. : 11/453342
DATED : April 24, 2007
INVENTOR(S) : Jean-Pierre Chauveau, Bruno Decreton and Gilles Le Saux It is certified that error appears in the above-identified patent and that said Letters Patent is hereby corrected as shown below:

Title Page
(73) Assignee, replace "Essilor International" with
  --Essilor International (Compagnie Generale d'Optique)--

Signed and Sealed this

Twenty-sixth Day of June, 2007

JON W. DUDAS
*Director of the United States Patent and Trademark Office*